United States Patent [19]

Sundstrom et al.

[11] Patent Number: 5,358,098
[45] Date of Patent: Oct. 25, 1994

[54] BELT CONVEYOR TRAINING IDLERS

[75] Inventors: Paul Sundstrom; Alan Huth, both of Calliope, Australia

[73] Assignee: Tasman Engineers Pty. Ltd., Calliope, Australia

[21] Appl. No.: 39,453
[22] PCT Filed: Oct. 22, 1991
[86] PCT No.: PCT/AU91/00488
    § 371 Date: Apr. 22, 1993
    § 102(e) Date: Apr. 22, 1993
[87] PCT Pub. No.: WO92/06908
    PCT Pub. Date: Apr. 30, 1992

[30] Foreign Application Priority Data
    Oct. 23, 1990 [AU] Australia .......... PK2959

[51] Int. Cl.$^5$ .................... B65G 39/16
[52] U.S. Cl. .................... 198/806; 198/810
[58] Field of Search .......... 198/806, 808, 810

[56] References Cited

U.S. PATENT DOCUMENTS

| | | | |
|---|---|---|---|
| 2,655,251 | 10/1953 | Bankauf | 198/806 |
| 3,621,728 | 11/1971 | Steorts | 198/808 |
| 4,664,303 | 5/1987 | Morse et al. | 198/806 X |
| 5,182,986 | 2/1993 | Bielfeldt | 198/806 X |
| 5,186,313 | 2/1993 | Denker et al. | 198/806 |

FOREIGN PATENT DOCUMENTS

| | | |
|---|---|---|
| 0023755 | 11/1981 | European Pat. Off. . |
| 1057016 | 10/1959 | Fed. Rep. of Germany . |
| 1556533 | 1/1970 | Fed. Rep. of Germany . |
| 1095891 | 6/1955 | France . |
| 2586235 | 8/1987 | France . |
| 698974 | 10/1953 | United Kingdom . |
| 1040565 | 9/1966 | United Kingdom . |

OTHER PUBLICATIONS

Abstract of Japan Patent 83-113008.

Primary Examiner—Cheryl L. Gastineau
Attorney, Agent, or Firm—Merchant, Gould, Smith, Edell, Welter & Schmidt

[57] ABSTRACT

If a conveyor belt creeps sideways, belt training idlers are used to return it to a central position. Conventionally the training idlers do this by pivoting about an axis normal to the conveyor belt surface (i.e. they "slew"). The slewing of the present training idlers however is also accompanied by a sideways tilting movement to increase the realigning influence of the idler. The combined movement of the idler is enabled by spherical bearing (10) which lines frame (4), carrying idler roller (5), to base frame (9). This bearing acts as a modified universal joint, with one degree-of-freedom removed by support rollers (11) attached to a shaft through the spherical bearing along axis (12) in the direction of belt travel on each end of the shaft. When respective servo roller (3) [alternatively pairs of servo rollers (13) may be used] is contacted by a misaligned belt edge it serves to slew the frame (4) to which it is attached about axis (6) passing through the bearing. At the same time a respective roller (7) on frame (4) is driven down an angularly adjustable inclined track (8) attached to base frame (9) so that the idler is tilted as well as slewed.

20 Claims, 2 Drawing Sheets

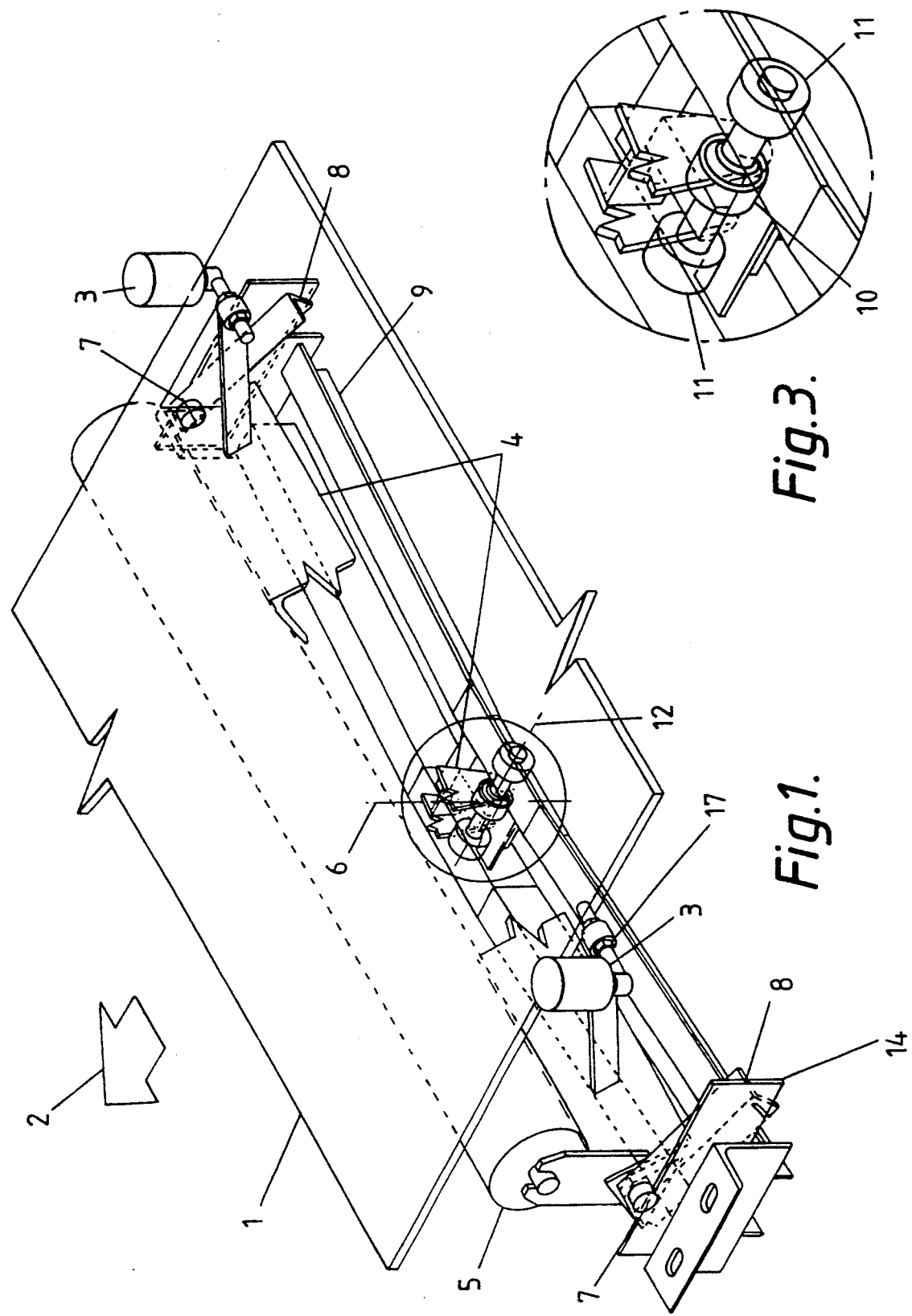

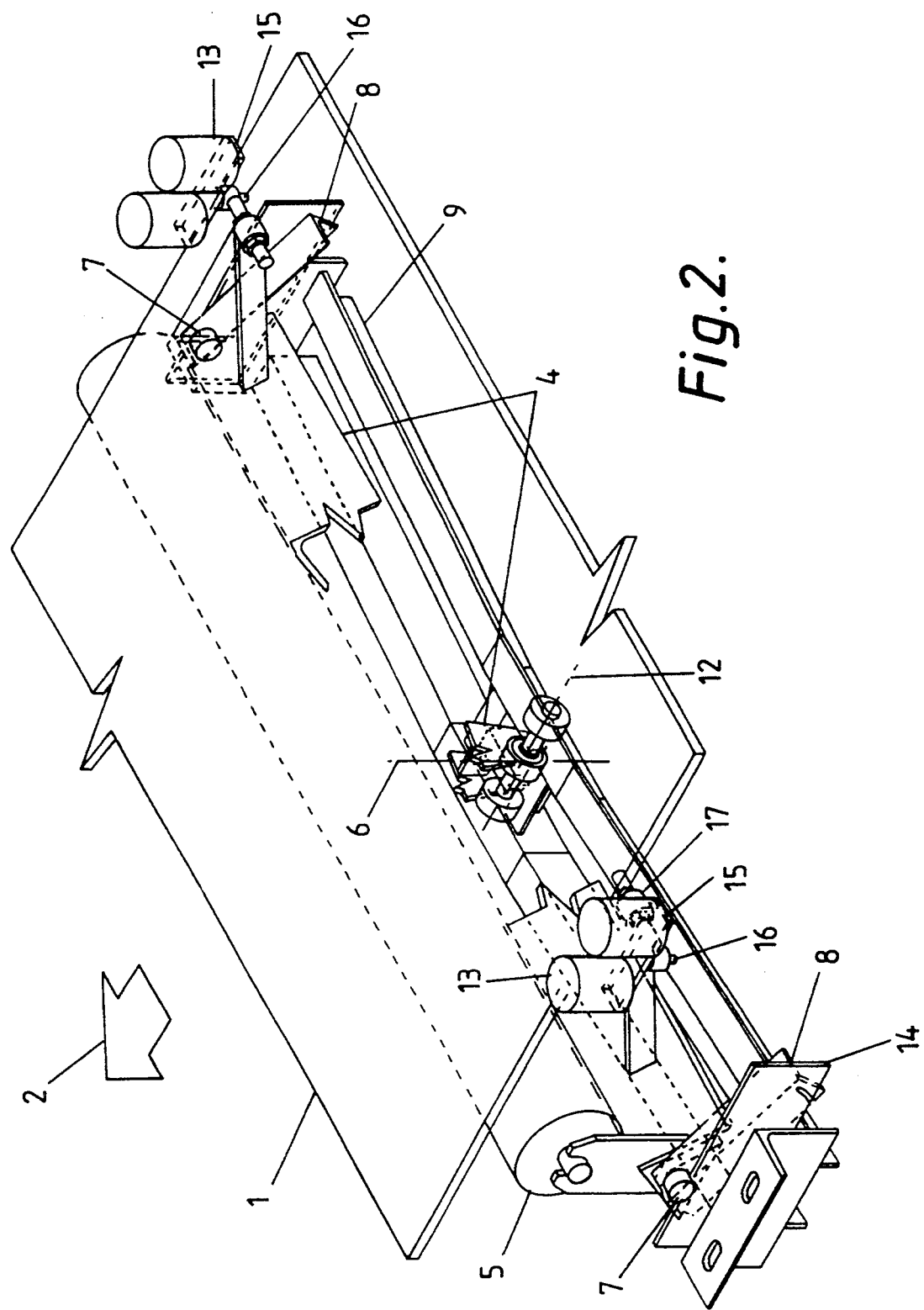

BELT CONVEYOR TRAINING IDLERS

This invention relates to improvements in training idlers for belt conveyors for correcting lateral misalignment of the belt.

BACKGROUND ART

With conventional training idlers, the motion of the idler training the belt is generally restricted to a slewing action about a central vertical axis normal to the width of the belt.

The angle between the training roller and the belt generates a lateral re-aligning influence on the belt that has become misaligned from its central position due to other influences.

The idler slewing frame is normally driven by servo rollers on either side of the belt, which in turn are activated by the belt as it misaligns laterally. The re-aligning influence that a training idler of this configuration can exert on the belt is limited by the single degree-of-freedom of training movement available to the idler and the frictional force that can be developed between the belt and the training idler.

French patent specification no. 2586235 discloses a training idler in which the idler roller frame is rotatably mounted on a stub axle fitted to a support frame. Such mounting between the two frames provides only one degree of freedom of movement, namely rotational movement about the stub axle. However, the stub axle is angled at 60° to the horizontal so that any slewing of the idler roller also results in tilting of the idler roller. There is a fixed relationship between the slewing and tilting actions of the idler roller which is determined by the angle of inclination of the axis of rotation of the idler frame.

In the training idler system of French patent specification 2586235, a positive force is applied to the idler frame to cause the frame to rotate, and hence tilt. This force is actuated by an optical sensor which detects misalignment of the belt. However, such an arrangement has several disadvantages. First, it is necessary to provide a mechanism to provide the positive tilting force. Such a mechanism increases the cost of the roller, as well as servicing requirements. Secondly, it is necessary to provide sensors to detect misalignment of the belt. Optical sensors are generally unsuitable for use in the dusty environments in which such belts normally operate, and must be cleaned regularly. Further, a source of power must be provided for each training idler.

SUMMARY OF THE INVENTION

It is an object of the present invention to provide an improved apparatus for correcting lateral misalignment of a conveyor belt, which overcomes or alleviates the disadvantages of known training idlers.

In one broad form, the present invention provides apparatus correcting lateral misalignment of a conveyor belt, comprising an idler roller upon which the belt is adapted to run; a base frame; a tilt frame having the roller rotatably mounted thereon, the tilt frame being pivotally mounted to the base frame; slewing means, responsive to the lateral misalignment of the conveyor belt, for causing slewing of the tilt frame and roller generally about an axis substantially normal to the belt to thereby urge the belt in a direction opposite to the misalignment; and tilting means responsive to the slewing of the tilt frame to cause the tilt frame and roller to pivot relative to the base frame about an axis substantially parallel to the direction of belt travel to further urge the belt in a direction opposite to the misalignment.

In a first aspect, the invention is characterised in that the slewing means comprises an abutment member located adjacent each edge of the conveyor belt but spaced therefrom, and wherein the urging of an edge of the conveyor belt against its associated abutment member due to misalignment of the belt causes slewing of the tilt frame and idler roller. That is, the physical urging of the belt itself against the abutment member is the actuating force which causes slewing, and hence tilting, of the tilt frame. No additional force is required, thereby simplifying construction requirements and enabling the apparatus to operate independently.

In a second aspect, the invention is characterised in that the pivotal mounting between the tilt and base frames provides two degrees of freedom of movement between the tilt and base frames.

The pivotal mounting between the tilt frame and the base frame is suitably a spherical bearing having a shaft passing through the bearing. Rollers are mounted on either end of the shaft. The outer housing of the bearing is connected to one of the tilt and base frames, while the rollers are connected to the other of the frames. This arrangement enables the tilt frame to be supported by the base frame, while still permitting independent slewing and tilting motion between the two frames.

Typically, the tilting means comprises at least one guiding member, such as a track or rail, connected to one of the tilt and base frames, and an associated guided member, such as a roller, connected to the other one of the tilt and base frames. As the roller follows the track, the path of motion of the roller is defined by the track on which it rolls. The track is shaped and orientated to cause the slewing motion of the tilt frame to be translated into tilting motion also.

Preferably, the track is of adjustable inclination or orientation to allow variation of the degree to which the slewing motion is translated into tilting motion.

Typically, a track and roller arrangement is provided at both ends of the tilt frame.

The abutment member typically comprises one or more servo rollers on either side of the belt, adjacent a respective edge thereof. The rollers are mounted on arms connected to the tilt frame. When the edge of the belt presses against an associated servo roller, it induces slewing of the pivotally mounted tilt frame/idler roller assembly.

In order that the invention may be more fully understood and put into practice, a preferred embodiment will now be described by way of example.

BRIEF DESCRIPTION OF THE DRAWING

FIG. 1 is a schematic isometric view of one embodiment of the invention.

FIG. 2 is a schematic isometric view of another embodiment of the invention.

FIG. 3 is an isometric view showing enlarged detail of part of FIG. 1.

DESCRIPTION OF PREFERRED EMBODIMENT

As shown in the drawing, when a conveyor belt 1 misaligns sideways relative to its direction of travel 2, it comes into contact with an abutment member, being one of two side mounted servo rollers 3. The servo rollers 3 are attached to the tilt frame 4, which in turn supports a belt support roller 5. The force exerted on the servo roller 3 causes the tilt frame/belt support roller assembly to rotate about an axis 6, normal to the width of the conveyor belt 1, generally referred to as slewing motion.

The tilt frame 4 also has guide rollers 7, mounted at each end, and these engage rails or tracks 8, at either end of a base frame 9. The tracks 8 are inclined at an angle to the direction or plane of belt travel.

The tilt and base frames are connected by a plain spherical bearing 10, and shaft assembly which behaves as a ball joint, permitting all three angular degrees-of-freedom.

Support rollers at each end of the shaft 11, limit one of these angular degrees-of-freedom, and prevent the tilt frame/belt support roller assembly 4,5 from collapsing onto the base frame 9.

As the tilt frame/belt support roller assembly begins to slew, the guide roller 7 on the opposite side to the direction of belt misaligning movement comes into contact with the underside of its corresponding track 8, and is driven down the track.

Only one of the two guide rollers 7 is active and in contact with its associated track 8 at any time.

The movement of the active guide roller 7 lowers the near side of the tilt frame/belt support roller assembly 4,5, and raises the far side, thus causing the assembly 4,5 and the conveyor belt 1 to rotate about an axis 12, substantially parallel to the direction of belt travel 2, generally referred to as a tilting motion.

This generates two additional re-aligning influences.

(a) It creates variable tension across the conveyor belt, with lower tension on the near side and higher tension on the far side, inducing a tendency for the conveyor belt to return to its central position to equalise the tension across the conveyor belt.

(b) It enhances the re-aligning effect of the slewing component of motion, by creating a downward path for the said conveyor belt.

This invention is designed to work in either the top or bottom belt strands of the conveyor, and with the conveyor belt in a variety of configurations. The flat belt support roller depicted in FIG. 1 can be replaced by two-roll, vee configuration idlers, or multiple roll trough configuration idlers.

The ratio between slew and tilt angles can be regulated by varying the angle of inclination of the tracks 8.

The track angle is adjustable by rotating the tracks 8 about a pivot point on track support plate 14.

The guide rollers 7 and tracks 8 may be arranged in a number of alternative configurations, for example;

(a) With the tracks 8 fixed to the tilt frame 4 and the guide rollers 7 fixed to the base frame 9.

(b) With the guide rollers 7 running on the top side of the tracks 8 as opposed to the underside of the tracks 8 as depicted in FIG. 1.

The single servo rollers depicted in FIG. 1 can be replaced by multiple servo roller assemblies 13 as depicted in FIG. 2, with the assemblies pivoting on a shaft 16, about axes normal to the belt.

In order to distribute the load evenly between individual rollers, the multiple servo rollers are mounted on walking beams 15.

This reduces the edge pressure on the conveyor belt 1, and enables each training idler to do considerably more work without damaging the said conveyor belt.

The lateral distance between the servo rollers 3,13 and the edges of the conveyor belt may be adjusted by means of an adjustment screw 17.

This enables variation within nominal belt width to be accommodated and also enables the sensitivity of the training idler to be adjusted by varying the amount of lateral misalignment of the conveyor belt required to activate the training idler.

We claim:

1. Apparatus for correcting lateral misalignment of a conveyor belt, comprising an idler roller upon which the belt is adapted to run;

a base frame;

a tilt frame having the roller rotatably mounted thereon, the tilt frame being pivotally mounted to the base frame;

slewing means, responsive to the lateral misalignment of the conveyor belt, for causing slewing of the tilt frame and roller generally about an axis substantially normal to the belt to thereby urge the belt in a direction opposite to the misalignment;

tilting means responsive to the slewing of the tilt frame to cause the tilt frame and roller to pivot relative to the base frame about an axis substantially parallel to the direction of belt travel to further urge the belt in a direction opposite to the misalignment;

characterised in that the slewing means comprises an abutment member located adjacent each edge of the conveyor belt but spaced therefrom, and wherein the urging of an edge of the conveyor belt against its associated abutment member due to misalignment of the belt causes slewing of the tilt frame and idler roller.

2. Apparatus for correcting lateral misalignment of a conveyor belt, comprising an idler roller upon which the belt is adapted to run;

a base frame;

a tilt frame having the roller rotatably mounted thereon, the tilt frame being pivotally mounted to the base frame;

slewing means, responsive to the lateral misalignment of the conveyor belt, for inducing slewing of the tilt frame and roller generally about an axis substantially normal to the belt to thereby urge the belt in a direction opposite to the misalignment;

tilting means responsive to the slewing of the tilt frame to cause the tilt frame and roller to pivot relative to the base frame about an axis substantially parallel to the direction of belt travel to further urge the belt in a direction opposite to the misalignment;

characterised in that the pivotal mounting between the tilt and base frames provides two degrees of freedom of movement between the tilt and base frames.

3. Apparatus as claimed in claim 1, wherein the tilting means comprises at least one guiding member connected to one of the tilt and base frames, and an associated guided member connected to the other one of the tilt and base frames, whereby the path of movement of the guided member is governed by the guiding member to cause slewing motion of the tilt frame to be translated into tilting motion thereof.

4. Apparatus as claimed in claim 3, wherein the guiding member is of adjustable orientation to vary the degree to which the slewing motion of the tilt frame is translated into tilting motion thereof.

5. Apparatus as claimed in claim 3, wherein the guided member is a roller, and the guiding member is a track inclined to the direction of travel of the belt.

6. Apparatus as claimed in claim 3, comprising two guiding members and two respective guided members, each guided member being a roller and each guiding member being a track inclined to the direction of travel of the belt, the guided members being connected to one of the tilt and base frames adjacent opposite ends thereof, and the guiding members being connected to the other one of the tilt and base frames adjacent opposite ends thereof on either side of the conveyor belt.

7. Apparatus as claimed in claim 1, wherein the distance between each abutment member and the conveyor belt is adjustable.

8. Apparatus as claimed in claim 1, wherein each abutment member is a servo roller rotatably mounted on a respective arm connected to the tilt frame, each servo roller being rotatable about an axis generally perpendicular to the plane of the belt.

9. Apparatus as claimed in claim 1, wherein each abutment member comprises a set of two or more servo rollers, each set being mounted on a respective arm connected to the tilt frame.

10. Apparatus as claimed in claim 1, wherein the pivotal mounting between the tilt frame and the base frame permits separate relative tilting and slewing between the frames.

11. Apparatus as claimed in claim 10, wherein the pivotal mounting comprises a spherical bearing, a shaft passing through the spherical bearing, and a pair of rollers mounted on the shaft on either side of the spherical bearing.

12. Apparatus as claimed in claim 2, wherein the slewing means comprises a pair of servo rollers mounted on the tilt frame and located adjacent opposite edges of the conveyor belt, wherein the urging of an edge of the conveyor belt against its associated servo roller due to misalignment of the belt causes slewing of the tilt frame and idler roller.

13. Apparatus as claimed in claim 12, wherein each servo roller is rotatably mounted on a respective arm connected to the tilt frame, each servo roller being rotatable about an axis generally perpendicular to the plane of the belt.

14. Apparatus as claimed in claim 2, wherein the slewing means comprises sets of two or more servo rollers, each set being mounted adjacent a respective edge of the conveyor belt.

15. Apparatus as claimed in claim 2 wherein the pivotal mounting between the tilt frame and the base frame permits separate relative tilting and slewing between the said frames.

16. Apparatus as claimed in claim 15, wherein the pivotal mounting comprises a spherical bearing, a shaft passing through the spherical bearing, and a pair of rollers mounted on the shaft on either side of the spherical bearing.

17. Training idler apparatus for correcting lateral misalignment of a conveyor belt, comprising
an idler roller upon which the belt is adapted to run;
a support frame;
a tilt frame having the roller rotatably mounted thereon, the tilt frame being pivotally mounted to the support frame, and the pivotal mounting of the tilt frame to the support frame permitting only relative tilting and slewing of the frames;
a pair of servo rollers located adjacent respective opposite edges of the belt, each servo roller being mounted on a respective arm connected to the tilt frame, whereby the urging of an edge of the conveyor belt against its associated servo roller due to misalignment of the belt causes slewing of the tilt frame and idler roller relative to the support frame about an axis substantially normal to the direction of travel of the belt to thereby urge the belt laterally in a direction opposite to the misalignment;
characterised in that the apparatus further comprises a guide track connected to one of the tilt and support frames, and an associated guide roller connected to the other of the tilt and support frames, whereby in use, the path of motion of the guide roller is defined by the guide track to translate slewing motion of the tilting frame into tilting motion about an axis generally parallel to the direction of belt travel to further urge the belt in a direction opposite to the misalignment.

18. Apparatus as claimed in claim 2, wherein the tilting means comprises at least one guiding member connected to one of the tilt and base frames, and an associated guided member connected to the other one of the tilt and base frames, whereby the path of movement of the guided member is governed by the guiding member to cause slewing motion of the tilt frame to be translated into tilting motion thereof.

19. Apparatus as claimed in claim 18, wherein the guiding member is of adjustable orientation to vary the degree to which the slewing motion of the tilt frame is translated into tilting motion.

20. Apparatus as claimed in claim 18, wherein the guided member is a roller, and the guiding member is a track included to the direction of travel of the belt.

* * * * *